United States Patent [19]
Foglietti et al.

[11] 3,877,264
[45] Apr. 15, 1975

[54] ANTI-THEFT LICENSE PLATE FASTENER

[76] Inventors: Joseph A. Foglietti, 2411 Commercial St., Mingo Junction, Ohio 43938; Joseph N. De Franco, 132 Parkdale Rd., Steubenville, Ohio 43952

[22] Filed: May 3, 1974

[21] Appl. No.: 466,801

[52] U.S. Cl. ............... 70/237; 70/258; 296/1 C
[51] Int. Cl. .................................. B60r 25/00
[58] Field of Search ....... 70/258; 296/1 C; 292/262, 292/264; 70/159, 160, 258, 237

[56] References Cited
UNITED STATES PATENTS

| | | | |
|---|---|---|---|
| 1,325,538 | 12/1919 | Smith | 292/264 |
| 1,850,367 | 3/1932 | Winter | 292/264 |
| 2,846,261 | 8/1958 | Nickles | 296/1 C |
| 3,011,818 | 12/1961 | Matthiessen | 292/264 |
| 3,131,000 | 4/1964 | Pierce | 296/1 C |
| 3,836,187 | 9/1974 | Buettner | 292/264 |

Primary Examiner—Paul R. Gilliam
Assistant Examiner—Victor N. Sakran
Attorney, Agent, or Firm—Shlesinger, Arkwright, Garvey & Dinsmore

[57] ABSTRACT

The invention relates to a device for preventing unauthorized access to the gasoline tank filler opening of a motor vehicle. It comprises a license plate holder which is pivotally attached to the body of the motor vehicle, and a cable fastened to the holder and passing into the vehicle trunk where it may be secured thereby preventing the license plate assembly from being tilted to a position which would expose the fuel tank filler opening.

14 Claims, 5 Drawing Figures

PATENTED APR 15 1975  3,877,264

ANTI-THEFT LICENSE PLATE FASTENER

BACKGROUND OF THE INVENTION

With the ever-present problem of theft and vandalism related to automobiles and other vehicles, there exists a need for means whereby access to the fuel tank by unauthorized persons may be controlled. Not only is an unlocked fuel tank a likely target for gasoline siphoning, but vandals may deposit foreign material in the fuel tank with resultant damage to the engine when the material reaches the carburetor or combustion chambers.

Although in the past attempts have been made to render the fuel tank secure from thieves and vandals, they have often proved ineffective or impractical. For instance, U.S. Pat. No. 1,949,523 discloses a fuel tank having an auxiliary closure which is operated from within the passenger compartment of the vehicle by means of a cable. Since a special fuel tank is required, however, the apparatus is impractical for use on existing vehicles having tanks of conventional design. Further prior art examples of devices generally of this type include "Popular Science," April 1956, Page 225 and French Pat. No. 1,006,532. Although these devices could be implemented on most existing vehicles without substantial difficulty, their visibility would tend to impair the appearance of the vehicle.

OBJECTS OF THE INVENTION

It is, therefore, an object of this invention to provide a device for preventing unauthorized access to the fuel tank of a motor vehicle which may not be easily rendered inoperative by the actions of thieves and vandals.

Another object of this invention is to provide a device efor preventing unauthorized access to the fuel tank of a motor vehicle which may be readily implemented on many existing vehicles.

A further object of this invention is to provide a device for preventing unauthorized access to the fuel tank of a motor vehicle which does not impair the aesthetic beauty of the vehicle.

A still further object of this invention is to provide a device for preventing unauthorized access to the fuel tank of a motor vehicle which may be rapidly and easily locked and unlocked.

These and other objects will become apparent from the following description with reference to the appropriate drawings.

SUMMARY OF THE INVENTION

The invention relates to a device for preventing unauthorized access to the fuel tank filler opening of a motor vehicle. It comprises a license holder, hinge means for pivotally attaching the holder to the body of a motor vehicle, cable means fastened to the holder at a point spaced from the hinge means, and means for securing a portion of the cable means within a locked compartment of a motor vehicle to thereby prevent the rotation of the holder such that the fuel tank filler opening is exposed.

DETAILED DESCRIPTION

Figure 1:
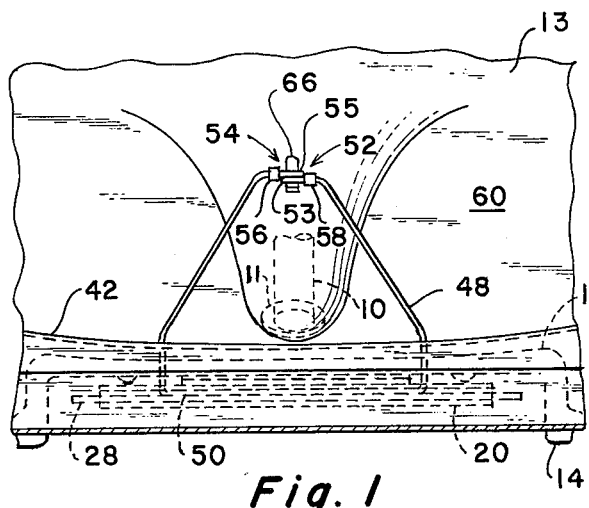
FIG. 1 is a partial sectional top plan view of a portion of an automobile on which the invention has been installed; the invention is shown in a locked position.

As is common practice in automobile design, the filler neck 10 and cap 11 of the fuel tank (not shown) is located underneath a raised portion 12 of the trunk floor 13 and behind the rear bumper 14. To permit ease in refueling, the bumper 14 is partially cut away as at 16.

Figure 2:
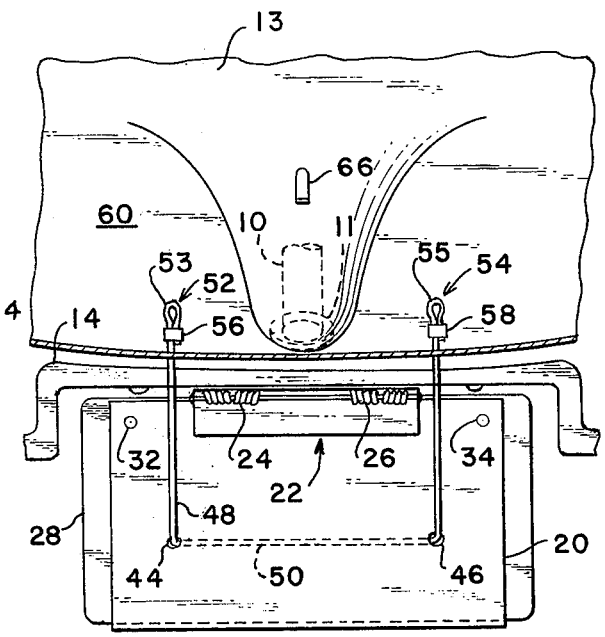
FIG. 2 is a sectional view of FIG. 3 taken along Line 2—2 and viewed in the direction of the arrows.
Figure 3:
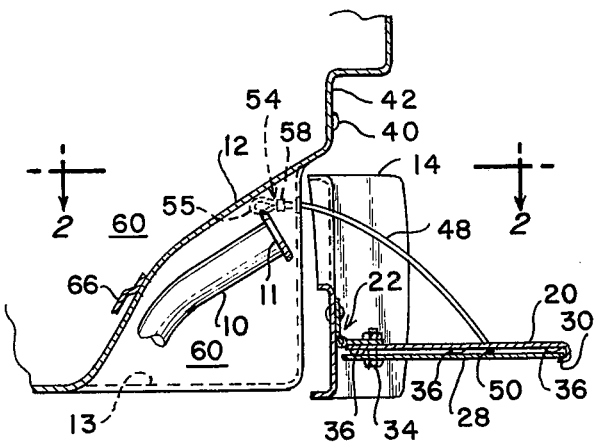
FIG. 3 is a sectional view of FIG. 4 taken along Line 3—3 and viewed in the direction of the arrows.
Figure 4:
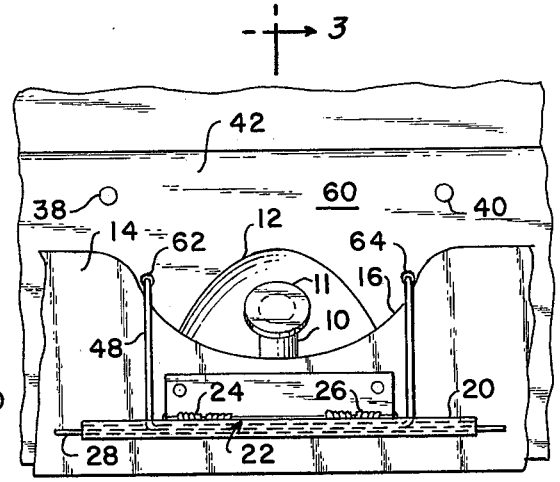
FIG. 4 is a rear elevational view of the device illustrated in FIG. 1 and wherein the invention is shown in an unlocked position.

A license plate holder 20 is pivotally mounted to rear bumper 14 by means of hinge 22, the latter including springs 24 and 26 to assist in maintaining the holder in a closed (FIG. 1) or open (FIGS. 2, 3 and 4) position. The license plate 28 is retained on holder 20 by means of lip 30 and bolts 32 and 34. Holder 20 is provided with a plurality of buttons 36 made of rubber or other appropriate resilient material to prevent license plate 28 from rattling against holder 20. Likewise, resilient buttons 38 and 40 mounted externally on the trunk wall 42 serve to eliminate rattle between holder 20 and the automobile body when the former is in the closed position.

Holder 20 is provided with a pair of apertures 44 and 46 through which a cable or other elongated preferably flexible, member 48 passes,, a portion 50 thereof being positioned between holder 20 and plate 28. The ends 52 and 54 of cable 48 are formed into loops or eyes 53 and 55 by means of conventional cable clamps 56 and 58 and are loosely positioned within trunk 60. It should be noted that in lieu of forming the ends 52 and 54 of cable 48 into loops, rigid cable eyes (not shown) may be clamped or otherwise secured thereto. Cable 48 passes into trunk 60 through a pair of apertures 62 and 64 in trunk wall 42; the diameter of apertures 62 and 64 are sufficiently large to permit the cable to freely slide therethrough. A hook, pin or other projecting element 66 is rigidly mounted to the trunk floor 18 and positioned such that when the license plate holder 20 is in the closed position (FIG. 1), the cable eyes 53 and 55 will be able to just slip over it thereby preventing the holder 20 from being tilted to its open position.

Figure 5:
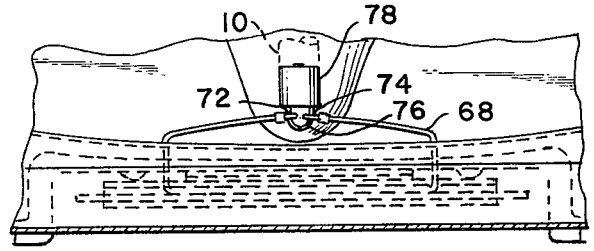
FIG. 5 is a partial sectional view similar to FIG. 1 illustrating a modified form of the invention.

A modified form of the invention is illustrated in FIG. 5. Similarly to the previous embodiment, cable 68 passes through trunk wall 70 and is looped to form eyes 72 and 74. The length of cable 68 is such that when the license plate holder is in the closed position, eyes 72 and 74 will barely overlap to permit the shackle 76 of padlock 78 to pass through.

The device operates in the following manner:

When it is desired to prevent access to the filler neck 10, the trunk lid (not shown) is opened, the license plate holder 20 swung to its closed position, cable 48 pulled through apertures 62 and 64 and eyes 53 and 55 looped over hook 66. By closing and locking the trunk lid, a thief or vandal will be unable to unhook cable 48 and gain access to the filler neck 10 by tilting license plate holder 20 downward. When refueling is necessary, eyes 53 and 55 are lifted off hook 66 thereby permitting cable 48 to be partially withdrawn from trunk 60 and the holder 20 tilted downward.

In the embodiment shown in FIG. 5, the filler neck 10 is secured by tilting the holder to its closed position, pulling cable 68 within the trunk and locking eyes 72 and 74 together by means of padlock 78.

In both of the embodiments, it is necessary that the cables 48 and 68 be of a length which precludes more than minimal tilting of the holder when they are secured by means of hook 66 and padlock 78, respectively. Should adjustment be necessary to accommodate the device for a particular vehicle, it is merely necessary to remove one of the cable clamps, cut the cable to the proper length, reform the cut end into a loop and re-attach the clamp.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains, and as may be applied to the essential features hereinbefore set forth and fall within the scope of this invention or the limits of the appended claims.

What is claimed is:

1. A device for preventing unauthorized access to the fuel tank filler opening of the motor vehicle comprising:
   a. a license plate holder,
   b. hinge means for pivotally attaching said holder to the body of the motor vehicle,
   c. cable means fastened to said holder at a point spaced from said hinge means, and
   d. means for securing a portion of said cable means within a locked compartment of a motor vehicle to thereby prevent the rotation of said holder such that the fuel tank filler opening is exposed.

2. The device of claim 1 and including an eye on said portion of said cable means within a locked compartment.

3. The device of claim 2 and wherein said means for securing a portion of said cable means within a locked compartment includes catch means for passing through said eye.

4. The device of claim 3 and wherein said catch means is a hook adapted to be rigidly mounted to the interior of a locked compartment of a motor vehicle.

5. The device of claim 3 and wherein said means for securing a portion of said cable means includes a padlock.

6. The device of claim 1 and wherein said cable means passes through a pair of apertures in said holder.

7. In combination with a motor vehicle including a body, a fuel tank filler opening and a license plate assembly rotatably mounted to said body through pivot means to selectively conceal said filler opening, a device for preventing unauthorized access to said filler opening comprising:
   a. an elongated member attached to said license plate assembly at a point spaced from said pivot means,
   b. said member passing through said body and into a lockable compartment of said vehicle,
   c. means within said compartment for selectively engaging said member to prevent withdrawing said member from said compartment and to thereby lock said license plate assembly in a position concealing said filler opening.

8. The device of claim 7 and wherein said member is flexible.

9. The device of claim 8 and wherein said member is a cable having an end positioned within said compartment.

10. The device of claim 9 and wherein said end of said cable has an eye thereon.

11. The device of claim 10 and wherein said means for selectively engaging said member includes a hook rigidly mounted within said compartment.

12. The device of claim 7 and wherein:
   a. said member is a cable having the ends thereof positioned within said compartment,
   b. said ends of said cable have eyes thereon,
   c. said means for engaging said member includes catch means for passing through said eyes.

13. The device of claim 12 and wherein said catch means is a hook rigidly mounted to said vehicle body.

14. The device of claim 12 and wherein:
   a. said means for engaging said member includes a padlock, and
   b. said catch means is the shackle of said padlock.

* * * * *